United States Patent [19]

Lewison

[11] Patent Number: 4,467,875

[45] Date of Patent: Aug. 28, 1984

[54] COMPACT, TRIPLE-HINGED AGRICULTURAL IMPLEMENT TOOL BAR

[75] Inventor: Richard A. Lewison, Pocahontas, Iowa

[73] Assignee: Ronald D. Wetherell, Cleghorn, Iowa

[21] Appl. No.: 332,523

[22] Filed: Dec. 21, 1981

[51] Int. Cl.³ .............................................. A01B 73/00
[52] U.S. Cl. .................................... 172/776; 172/502
[58] Field of Search .............. 172/311, 446, 456, 466, 172/501, 502, 662, 776, 260.5; 92/9, 10; 188/317, 319

[56] References Cited

U.S. PATENT DOCUMENTS

| | | | |
|---|---|---|---|
| 1,273,011 | 7/1918 | Snyder | 188/319 |
| 3,566,974 | 3/1971 | Kopaska | 172/502 X |
| 3,642,074 | 2/1972 | Geurts | 172/260.5 |
| 3,669,195 | 6/1972 | Green et al. | 172/311 |
| 3,692,121 | 9/1972 | Kenney | 172/456 |
| 3,844,358 | 10/1974 | Shuler et al. | 172/311 |
| 4,030,551 | 6/1977 | Boetto | 172/311 X |
| 4,030,716 | 6/1977 | Freitag | 188/317 X |
| 4,058,170 | 11/1977 | Ankenman et al. | 172/456 X |
| 4,064,977 | 12/1977 | Taylor | 188/317 |
| 4,204,575 | 5/1980 | Richardson et al. | 172/311 X |
| 4,232,767 | 11/1980 | De Kock | 188/319 |
| 4,320,805 | 3/1982 | Winter | 172/776 |

FOREIGN PATENT DOCUMENTS 288017  6/1964  Australia .............................. 188/319

Primary Examiner—Richard T. Stouffer
Assistant Examiner—William H. Honaker
Attorney, Agent, or Firm—Emrich, Lee, Brown & Hill

[57] ABSTRACT

A hydraulically actuated, triple-hinged tool bar comprised of four independently positioned sections is disclosed. A first outer section is flexibly coupled to one end of a center section of the tool bar while to the other end thereof is flexibly coupled an intermediate section, the length of which is less than that of the first outer section. A second outer section is flexibly coupled to the outer end of the intermediate section providing a lower profile when all sections of the tool bar are in the retracted, or non-working, position. Positioning control between the center section and the first outer and intermediate sections is provided by respective hydraulically-actuated cylinders while a third hydraulic cylinder coupling the intermediate and second outer section dampens the vertical movement of the latter for increased stability in the working and non-working positions. Spacers located between the center and first outer sections and between the first and second outer sections provide for the proper positioning and stability of the various sections when retracted.

13 Claims, 4 Drawing Figures

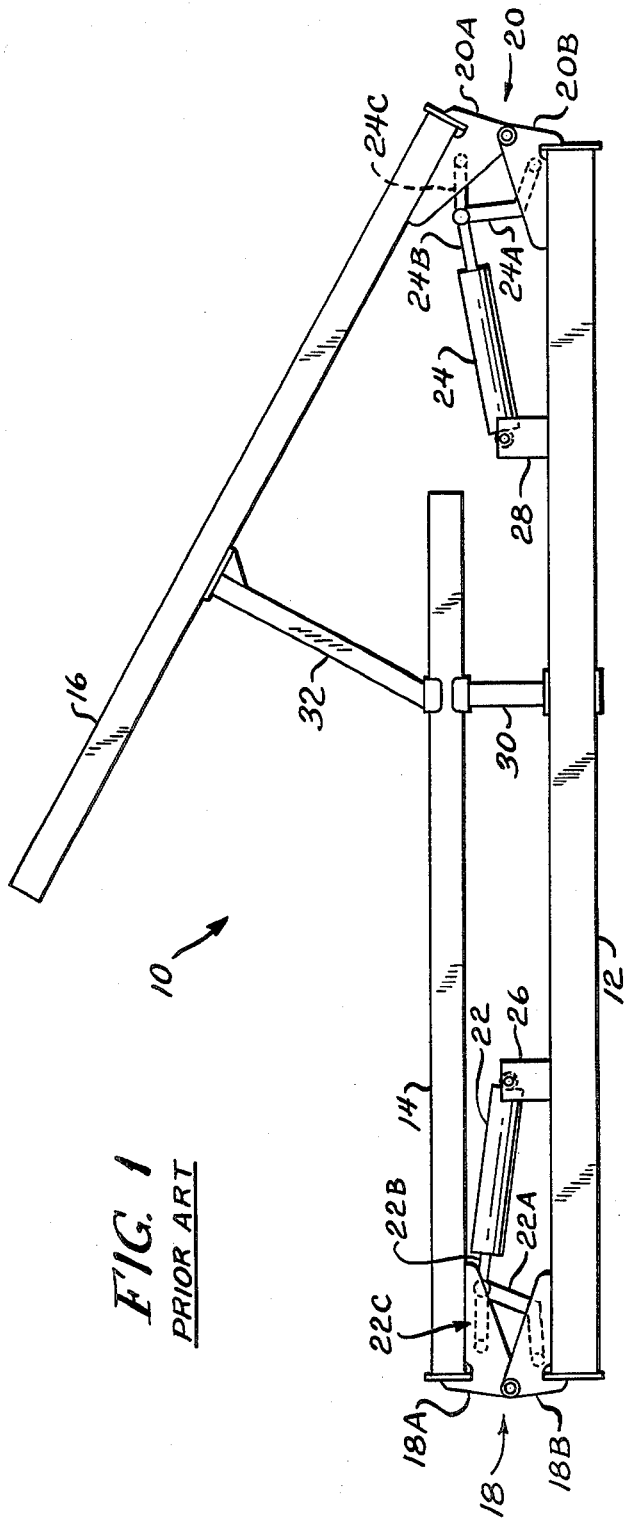
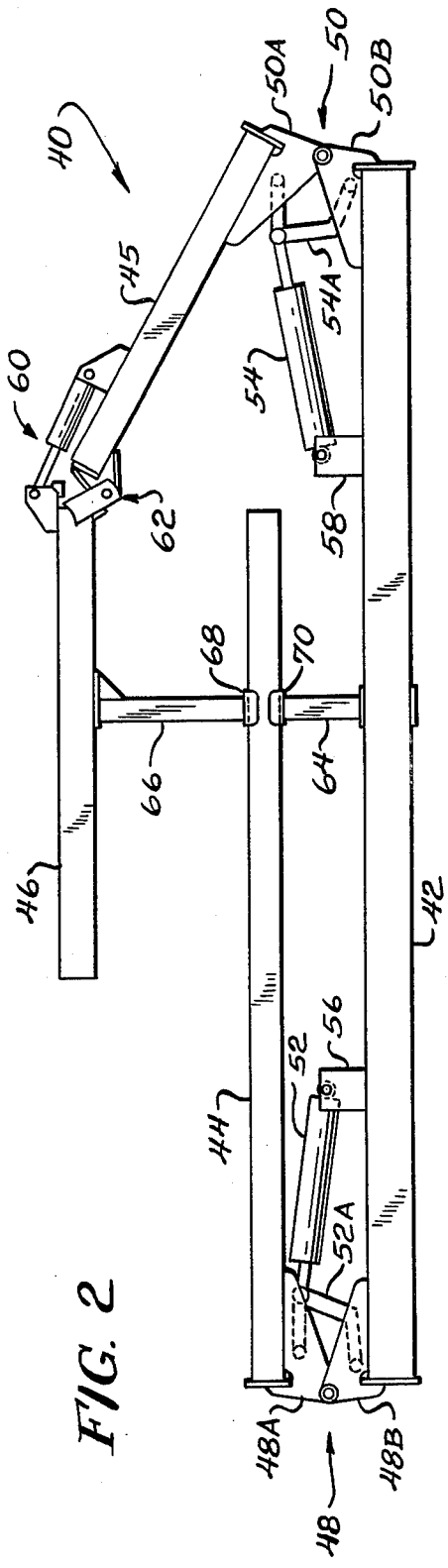
FIG. 1 PRIOR ART
FIG. 2

COMPACT, TRIPLE-HINGED AGRICULTURAL IMPLEMENT TOOL BAR

BACKGROUND OF THE INVENTION

The present invention relates generally to tool bars for supporting and positioning agricultural working implements and in particular is directed to a multi-section agricultural tool bar in which the positions of the various sections are controlled by a plurality of hydraulic cylinders.

A tool bar for agricultural use is a device adapted to be pulled by a vehicle, such as a tractor, and on which ground engaging implements are securely mounted. The tool bar provides support for the implements so that their placement and orientation relative to the ground remains generally unchanged during operation, and it also maintains a fixed lateral spacing between the working implements. The term "implements" is intended to have a broad meaning in the present disclosure and includes, but is not limited to, such agricultural tools as planters for seeds, coulters, fertilizer applicators, or any combination of these devices.

The development of tool bars has lead to increasingly longer length providing a wider swath coverage in reducing the number of passes required in the cultivation/planting process for a given area. This lengthening of the tool bar and corresponding increase in the number of working implements supported thereon, has been made possible, in part, by the availability of increasingly powerful tractors and has resulted in a reduction in the time and the fuel required to cultivate or plant a field of a given size. Multi-section tool bars of the prior art generally include first and second wings pivotally mounted to a main, or center, frame which is provided with support wheels. The wings or "bars" are pivoted between a use position in which the wings extend laterally with respect to the main frame and transverse to the direction of travel of the vehicle, and a road travel or storage position in which the wings extend either rearwardly of the main frame and parallel to the direction of travel of the vehicle or are folded upward so that the width of the entire retracted mechanism is no longer than the length of the main frame. The present invention relates to the latter flexible tool bar arrangement wherein the wings are folded vertically when the tool bar is in the retracted position for transport or storage.

Prior art vertically folding tool bars suffer from various operating limitations. One of the primary disadvantages of these systems relates to the transportability and maneuverability of the implement carried by the apparatus or tractor, as the case may be. Even in the fully retracted position, some of the earlier systems generally project laterally outward from the main frame of the tool bar, increasing the overall width of the tillage apparatus. In addition, in the retracted position the flexible wings extend a considerable height above the tractor and the implement carrying structure requiring that the wings be removed from the main frame in order to move the tool bar assembly into an enclosure for storage or repair unless the enclosing structure is provided with an over-sized access door. With increasing tillage implement size and pulling vehicle power, tool bar lengths have correspondingly increased requiring even larger access openings to accommodate current flexible tool bar arrangements.

The increasing size of multi-section tool bars has increased the susceptibility of these systems to damage. For example, the greater lengths and weights of the wing sections have increased the susceptibility of these systems to damage during transport in the retracted position due to excessive vibration and large forces applied thereto with the traversal of irregular road surfaces. In addition, the wing sections of the tool bar may be subjected to high impact forces due to contact with overhead structures, trees and utility lines. Contact with overhead utility lines may not only result in damage to the work implement but also, of course, poses a serious threat to the safety of the farmer. Another danger involving over-sized tool bars relates to their transport in the folded position. The higher the center of gravity, the more unstable is the transported tool bar with attached implements and the more unsafe is the transport operation particularly on rough, sloped terrain.

The present invention is intended to avoid the aforementioned limitations of prior art multi-section tool bars by providing a tool bar which is more easily and safely transported, does not require large storage and repair structures having correspondingly large access openings, and is compatible with a conventional pulling vehicle hydraulic system for agricultural implement positioning.

SUMMARY OF THE INVENTION

The present invention provides a multi-section tool bar for supporting agricultural implements in a working, or extended, position and a non-working, or retracted, position. The tool bar includes four independent sections wherein adjacent sections are flexibly coupled by means of a hydraulic cylinder. A center section, or main frame, is flexibly coupled to a first outer section at one end and to an intermediate section at the other end thereof. The relative positions of these sections are controlled by hydraulically-actuated cylinders. A second outer section is flexibly coupled to the outer end portion of the intermediate section by means of a third hydraulic cylinder which, by damping the vertical movement of the second outer section, provides for its stability in the working and non-working positions and protects the second outer section from high impact forces due to contact with soil obstructions in the working position and from excessive vibratory and shock forces due to road irregularities when transported in the retracted position. A rotation stop is positioned between the second outer and intermediate sections to provide adjustment and preclude over-rotation of the second outer section in the extended position. Spacers, or wing supports, positioned between the first outer and center sections and between the first and second outer sections insure the proper positioning and stability of the combination when in the retracted position. Flexible relative positioning between the intermediate and second outer sections permits the present invention to assume a lower profile in reducing the vertical clearance required when the tool bar of the present invention is transported or stored.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a front view of a typical hinged, multi-section tool bar of the prior art shown with the outer, or wing, sections in the retracted position;

FIG. 2 is a front view of a folding tool bar in accordance with the present invention with the various sections thereof shown in the folded position;

DETAILED DESCRIPTION OF THE PREFERRED EMBODIMENTS

Figure 3:
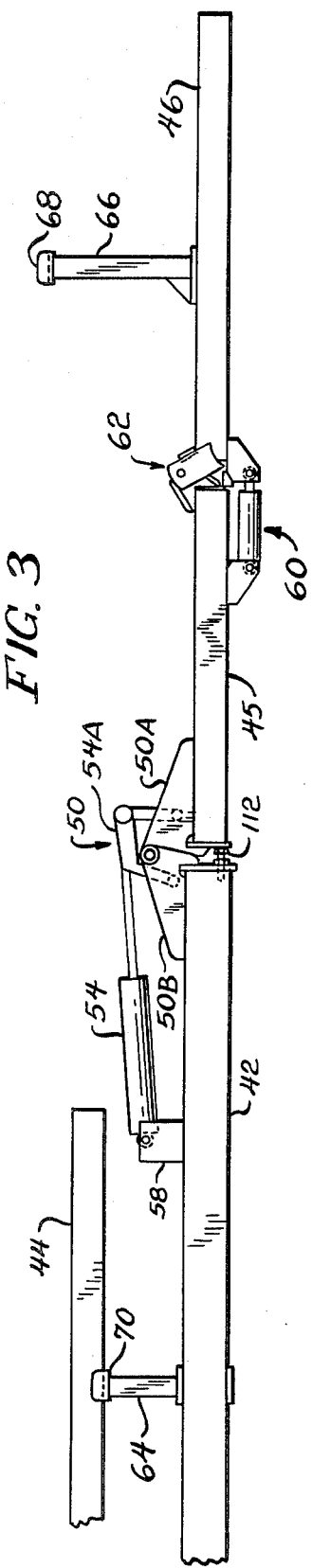
FIG. 3 is a front view of a folding tool bar in accordance with the present invention with an intermediate and an outer section thereof in the extended, or working, position.

Referring to FIG. 1 there is shown a typical prior art folding tool bar 10. The tool bar shown in FIG. 1 is in the retracted, or non-working position wherein the end sections have been folded upward and positioned above a center section, as will be presently explained. The center section remains in a horizontal orientation and is typically coupled to and supported by a set of wheels for transporting the entire folded tool bar assembly. The tool bar shown in FIG. 1 as well as the preferred embodiment of the present invention described below may be mounted either directly to the rear portion of a traction vehicle, such as a tractor, or may be positioned on a frame which, in turn, is coupled to and pulled by the traction vehicle. The frame thus pulled by the traction vehicle may include a plurality of such folding toolbars for supporting and positioning various combinations of ground working implements.

The prior art folding tool bar 10 of FIG. 1 includes a main frame 12 having one end flexibly coupled to a first wing 14 and its other end flexibly coupled to a second wing 16 by means of respective first and second hinge mechanisms 18, 20. First hinge mechanism 18 includes an outer member 18A affixed to first wing 14 and an inner member 18B affixed to the first end of main frame 12. Similarly, second hinge member 20 includes an outer member 20A mounted to one end of second wing 16 and an inner member 20B mounted to the second end of main frame 12. Outer and inner members 18A, 18B are rotationally coupled in a conventional manner. Similarly, outer and inner members 20A, 20B of the second hinge mechanism 20 are also rotationally coupled to one another by conventional means. This permits first and second wings 14, 16 to be either vertically displaced with respect to main frame 12 or to be displaced upward and outward with reference to FIG. 1 so as to assume horizontal positions in line with main frame 12. With first and second wings 14, 16 thus aligned with main frame 12, folding tool bar 10 is in the working, or extended, position.

Displacement of the first and second wings 14 16 is by means of hydraulic cylinders 22, 24, respectively. First and second hydraulic cylinders 22, 24 are pivotally mounted to an upper portion of main frame 12 by means of first and second main frame cylinder mounts 26, 28, respectively. The other end portions of first and second hydraulic cylinders 22, 24, or the movable piston rod portion thereof, are respectively coupled to connecting linkages 22A, 24A which, in turn, are coupled to first and second hinge mechanisms 18, 20. The linear displacement of piston rods 22B, 24B control the positioning of first and second wings 14, 16, respectively, by means of the connecting linkages 22C, 24C respectively therebetween. First and second hydraulic cylinders 22, 24 are controlled by a source of hydraulic pressure which typically is provided by the traction vehicle to which folding tool bar 10 is connected.

A first wing support/spacer 30 is typically mounted to the upper portion of main frame 12. This support/spacer engages the top portion of first wing 14 when in the fully retracted position for providing support therefor and insuring proper spacing between adjacent tool bar elements. Similarly, a second wing support/spacer 32 is mounted to an upper portion of second wing 16 for maintaining proper displacement between first and second wings 14, 16 when in the fully retraced position.

Referring to FIG. 2, there is shown a triple-hinged, four section, folding tool bar 40 in accordance with a preferred embodiment of the present invention. A main frame 42 is coupled at one end to a first wing 44 by means of a first hinge mechanism 48 and at its other end is coupled by means of second hinge mechanism 50 to an intermediate section 45 of the tool bar. Hinge mechanism 48 includes an outer member 48A coupled to one end of first wing 44 and an inner member 48B coupled to the first end of main frame 42. Similarly, second hinge mechanism 50 includes an outer member 50A connected to a first end of intermediate section 45 and an inner member 50B connected to a second end of main frame 42. The respective inner and outer members of hinge mechanisms 48, 50 are rotationally coupled to each other to permit the vertical displacement of these sections with respect to main frame 42.

First wing and intermediate sections 44, 45 are variably positioned with respect to main frame 42 by means of first and second hydraulic cylinders 52 and 54. The cylinder portion of the hydraulic cylinder 52 is coupled to main frame 42 adjacent its first end by means of first cylinder mounting bracket 56. Similarly, the second hydraulic cylinder 54 is coupled to main frame 42 near its second end by means of a second cylinder mounting bracket 58. The piston rod portions of hydraulic cylinders 52, 54 are respectively coupled to first and second hinge mechanisms 48, 50 by means of flexible linkages 52A, 54A. Thus, the linear displacement force available from hydraulic cylinders 52, 54 is converted to the rotational displacement of outer hinge members 48A, 50A with respect to inner hinge members 48B, 50B by means of connecting linkages 52A, 54A, respectively. With first wing section 44 and intermediate wing section 45 rigidly affixed to respective outer hinge members 48A, 50A, this hydraulic cylinder action results in the rotational displacement of first wing section 44 and intermediate section 45.

Coupled to the second end portion of the intermediate section 45 by means of hinged coupling bracket 62 and hydraulic damping cylinder and mount 60 is the second wing section 46 of the folding tool bar of the present invention. Hinged coupling bracket 62 provides rotational coupling between intermediate section 45 and the second wing section 46. The hydraulic damping cylinder and mount 60 provide a damping force for the vertical displacement of second wing section 46 with respect to intermediate section 45 in a manner to be described. When in the fully retracted position, as shown in FIG. 2, a first wing support/spacer 64 mounted on main frame 42 contacts first wing section 44 and provides support and proper spacing therefor with respect to main frame 42. Similarly, with second wing section 46 in the fully retracted position, a second wing support/spacer 66 rigidly coupled thereto provides support for intermediate section 45 and second wing section 46 and insures proper spacing between these sections and the other two sections when fully retracted.

To the distal ends of first and second wing support/spacers 64, 66 are mounted lower and upper stabilizers 70, 68. Upper and lower stabilizers 68, 70 include a grooved portion (shown in dotted line form in FIG. 2) in which is positioned first wing section 44 when retracted. The grooves in upper and lower stabilizers 68, 70 provide a recess in which first wing section 44 is positioned when retracted which restricts the forward and aft motion (which would be transverse to the plane of FIG. 2) when the tool bar is transported.

Referring to FIG. 3, there is shown the main frame 42, the intermediate section 45 and the second wing section 46 of the folding tool bar of the present invention in the extended, or working, position. In this configuration intermediate section 45 and second wing section 46 are aligned with main frame 42. Hydraulic cylinder 54 is extended and has rotationally displaced outer hinge member 50A in a clockwise direction with respect to inner hinge member 50B. Hydraulic cylinder 54 may be extended even farther than shown in FIG. 3 so that an adjustable mechanical stop 112 may be incorporated between main frame 42 and intermediate section 45 to allow for the downward (from the horizontal) "float" of intermediate section 45, if desired. Mechanical stop 112 may be any conventional mechanical means used for limiting the rotational displacement between two coupled elements, such as a nut welded to one end of section 45 in combination with an adjustable bolt, as shown in FIG. 3. With intermediate section 45 in the extended position and aligned with main frame 42, second wing section 46 is displaced downwardly by gravity action so as to become aligned with intermediate section 45. Hinged coupling bracket 62 provides for the rotational displacement of second wing section 46 with respect to intermediate section 45 and hydraulic damping cylinder and mount 60 dampens the vertical displacement of second wing section 46. With the vertical displacement of second wing section 46 thus dampened, damage to the folding tool bar caused by impact of the working implement with the ground due to the free fall of second wing section 46 is avoided. In addition, this damping effect stabilizes the vertical displacement of second wing section 46 and the implements coupled thereto during ground working to provide more effective implement control and improved ground working performance. As can be seen in FIG. 3, with second wing section 46 in the extended position, the second wing support/spacer 66 mounted to an upper portion thereof is oriented in a generally vertical direction.

Figure 4:
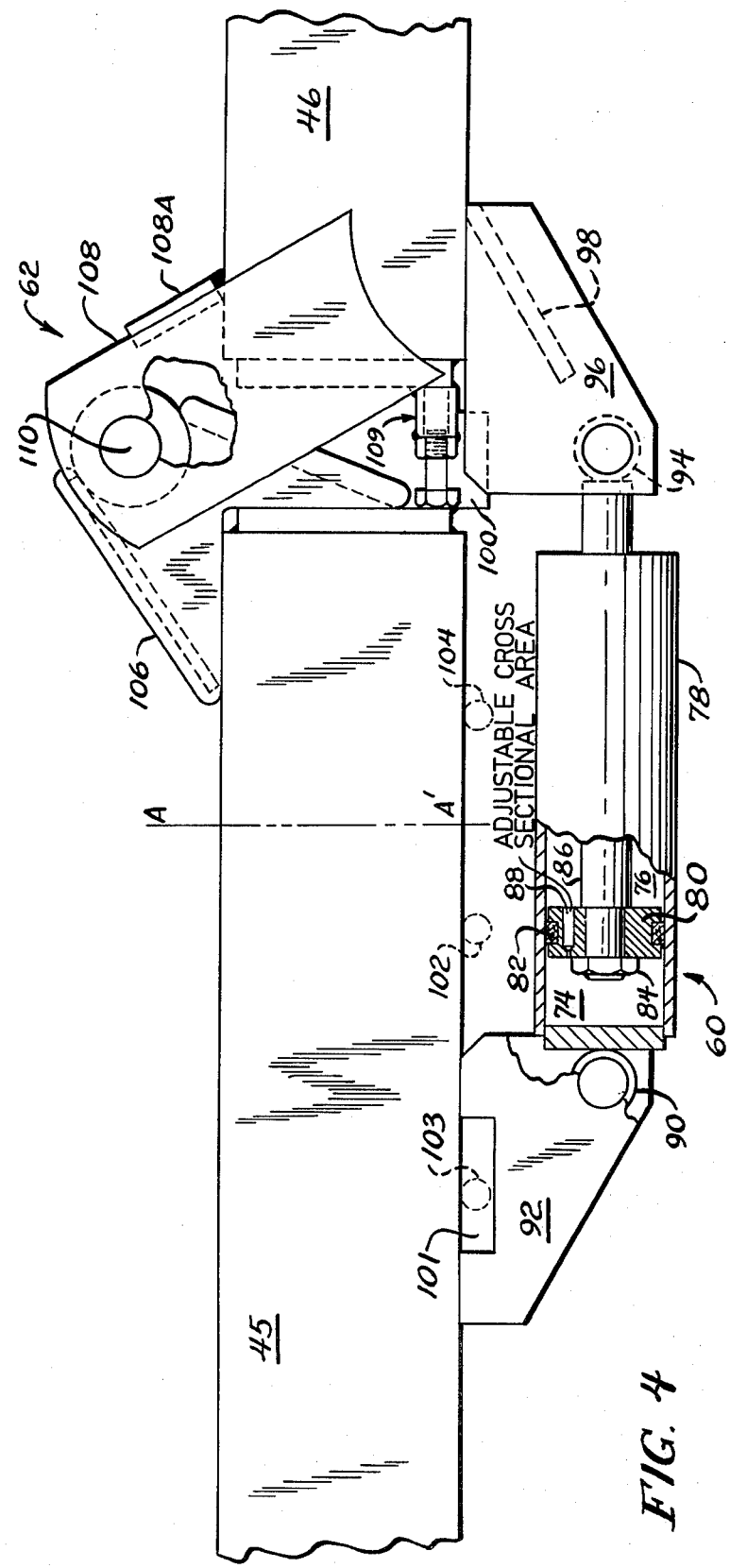
FIG. 4 is an enlarged front view of the coupling between the intermediate and outer sections shown in FIG. 3 including a cut-away view of a hydraulic cylinder for damping the relative motion between the adjacent sections.

Referring to FIG. 4, there is shown a partially cut away, expanded front view of the hydraulic damping cylinder and mount 60 and hinged coupling bracket 62 combination connecting intermediate section 45 and second wing section 46. Rigidly affixed to intermediate section 45 is cylinder mounting bracket 92 and rigidly affixed to second wing section 46 is rod mounting bracket 96. The cylinder portion of hydraulic cylinder 78 includes cylinder coupling 90 which is connected to cylinder mounting bracket 92 by conventional means, such as a nut/bolt combination (not shown). Similarly, the piston rod portion of cylinder 78 includes piston rod coupling 94 which is connected to rod mounting bracket 96 by like conventional coupling means.

Hydraulic cylinder 78 is a non-actuated, passive mechanism which serves to dampen the relative motion between intermediate and second wing sections 45, 46. Hydraulic cylinder 78 includes a piston rod, to one end of which is mounted a piston head 80 by means of mounting nut 84 coupled thereto. Positioned around the periphery of piston head 80 is a compressible O-ring forming a fluid-sealing contact surface with the internal surface of cylinder 78. On one side of piston head 80 is a first fluid chamber 74 while on the other side is a second fluid chamber 76. First and second chambers 74, 76 are filled with a conventional hydraulic fluid while the piston is fully retracted toward the end adjacent to cylinder mounting bracket 92 in order to provide resistance against the linear displacement of piston head 80 in hydraulic cylinder 78. The rotational displacement of second wing section 46 relative to intermediate section 45 results in the linear displacement of piston rod 86 and piston head 80 in hydraulic cylinder 78. When second wing section 46 is placed in the fully retracted position, piston rod 86 will be extended from cylinder 78 and the volume of second fluid chamber 76 will decrease with a corresponding increase in the volume of oil in the first fluid chamber 74. Similarly, when second wing section 46 is placed in the fully extended position, the linear displacement of piston head 80 will result in a decrease in the oil volume of first fluid chamber 74 and a corresponding increase in the oil volume of second fluid chamber 76. Motion dampening is achieved by permitting fluid flow through orifice 88 in piston head 80. Changes in the relative volumes of oil in the first and second fluid chambers 74, 76 are caused by the relative flow of the fluid within these chambers through orifice 88.

The size of orifice 88 may be fixed or adjustable in order to accommodate second wing sections of different length. For example, a longer outer section would necessitate increased damping action which would be available by decreasing the cross sectional area of orifice 88. On the other hand, a shorter second wing section 46 could be accommodated by increasing the cross sectional diameter of orifice 88 in reducing the damping action applied thereto. Fluid flow through orifice 88 is bidirectional, with fluid flowing in one direction during tool bar extension and flowing in the opposite direction during tool bar retraction. As in the case of cylinders 22, 24, any conventional damping media which may be either liquid or gaseous in nature may be utilized in damping cylinder 78. Indeed, the present invention contemplates the use of air, or air in combination with other relatively inert gases, confined in appropriate gas cylinders.

Rigidly coupled to the outer, or second, end portion of intermediate section 45 is intermediate bracket 106. Rigidly affixed to the inner end portion of second wing section 46 is outer bracket 108. Intermediate bracket 106 is rotationally coupled to outer bracket 108 by means of rotary coupler 110 which may be conventional in nature. With intermediate and outer brackets 106, 108 rotationally coupled and rigidly affixed respectively to intermediate and second wing sections 45, 46, the latter two sections are free to rotate relative to one another. Rigidly coupled to the outer bracket 108 and second wing section 46 is outer bracket reinforcing support 108A. Similarly, rigidly coupled to rod mounting bracket 96 and second wing section 46 is mounting bracket reinforcing support 98. Mounting bracket reinforcing support 98 and outer bracket reinforcing support 108A are incorporated in order to strengthen the coupling between intermediate and second wing sections 45, 46 and to prevent the twisting of second wing section 46 relative to intermediate section 45 caused by the drag of the ground engaging implement gangs mounted thereon. Positioned on the outer end of intermediate section 45 is a guide 100 which is slidable between a pair of rod mounting brackets 96 such that undesirable twisting within the hinged coupling bracket 62 is reduced when second wind section 46 is lowered to the extended position. Guide 100 is fixedly mounted between the pair of fore and aft rod mounting brackets 96 in a conventional manner. A pair of adjustable rotation stops 109 are fixed to the inner end of second wing section 46 and variably adjustable with respect to the outer end of intermediate wing section 45 to permit rotation stops 109 to selectively limit the downward displacement of second wing section 46, affording improved implement positioning relative to the ground being worked. Rotation stops 109, similar to rotation stop 112, may be conventional in nature such as a mounted nut/adjustable bolt combination as shown in FIG. 4.

Various positions for implement mounting brackets are indicated in dotted line form as circles 102, 103 and 104. Typically, brackets 102 and 104 would be used to mount a single working implement with line A—A' representing the center line of that implement. Bracket 103 which is positioned within channel 101 between cylinder mounting bracket 92 and intermediate section 45 would form one half of the mounting assembly for an adjacent working implement. From FIG. 4, it can be seen that the hydraulic damping cylinder and mount 60 and hinged coupling bracket 62 used to rotationally couple the intermediate and second wing sections 45, 46 have a minimal impact upon working implement positioning along the folding tool bar and any restrictions resulting therefrom are of minimal consequence.

There has thus been shown a folding tool bar comprised of four hinged sections. A main frame supported on wheels for ease in transporting has one end flexibly coupled to a first outer section and a second end flexibly coupled to an intermediate section. The flexible couplings include hydraulically-actuated cylinders for the vertical positioning of these two sections relative to the main frame. Flexibly coupled to the outer end of the intermediate section is a second outer section which in the extended position is aligned along and parallel to the other three tool bar sections. In the retracted position, the second outer section is flexed relative to the intermediate section and oriented generally parallel to the main frame for reducing the profile of the retracted folding tool bar facilitating its transport and maneuverability. Its lower profile makes the folding tool bar of the present invention more easily moved into or out of an enclosed storage or repair structure having an access opening of a given size.

The matter set forth in the foregoing description and accompanying drawings is offered by way of illustration only and not as a limitation. Changes in construction will occur to those skilled in the art and various apparently different modifications and embodiments may be made without departing from the scope of the invention. For example, the present invention is not limited to the use of hydraulically-actuated cylinders as the drive mechanism for tool bar section positioning. Other conventional means for tool bar section positioning control, such as cables or electric actuators, could equally as well be used in the present invention. Thus, the matter set forth in the foregoing description and accompanying drawings is offered by way of illustration only and not as a limitation. The actual scope of the invention is intended to be defined in the following claims when viewed in their proper perspective against the prior art.

I claim:

1. A folding tool bar for supporting agricultural implements mounted thereon, said tool bar including a plurality of flexibly coupled adjacent sections movable between a retracted position and an extended position by a plurality of drive means each coupled between adjacent sections for the relative displacement thereof, said tool bar comprising:

a center section having first and second end portions;

a first outer section flexibly coupled to the first end of said center section by means of first drive means;

an intermediate section having first and second end portions, with the first end portion of said intermediate section flexibly coupled to the second end portion of said center section by means of second drive means;

a second outer section; and damping means resiliently coupling said second outer section to the second end portion of said intermediate section to provide a constant motion restraining and limiting the rate of relative displacement between said second outer section and said intermediate section while retaining and holding said second outer end portion in substantially parallel position with respect to said center section when the folding tool bar is in the retracted position.

2. A tool bar as in claim 1 wherein said flexible damping means includes hinge means for the flexible coupling of said second outer section to said intermediate section and a hydraulic cylinder for the rotational displacement damping of said second outer section.

3. A tool bar as in claim 2 wherein said hydraulic cylinder includes a linearly displaceable piston rod and piston head assembly therein, said piston head dividing said cylinder into two hydraulic fluid-filled chambers with said piston head including an orifice therein for permitting said fluid to pass between said chambers in response to the displacement of said piston head and piston rod assembly.

4. A tool bar as in claim 3 wherein said orifice in said piston head includes a cross-sectional are which is adjustable for changing the dampening characteristics of said hydraulic cylinder for accomodating second outer sections of various lengths and weights.

5. A tool bar as in claim 1 wherein each of said drive means includes a hydraulically-actuated cylinder.

6. A tool bar as in claim 1 further comprising first and second spacer means positioned between said first outer section and said center and second outer sections, respectively, for the stabilizing and proper positioning of said first and second outer sections when retracted.

7. A tool bar as in claim 6 wherein said first spacer means is mounted on an upper surface of said center section and said second spacer means is mounted on an upper surface of said second outer section when extended.

8. A tool bar as in claim 7 further including grooved positioning means mounted distally on said first and second spacer means with respect to said center and second outer sections, respectively, for engaging said first outer section when retracted in providing enhanced retracted position stability for said first and second outer sections.

9. A tool bar as in claim 1 wherein said first and second outer sections are positioned in a generally horizontal orientation and parallel to said center section when retracted.

10. A tool bar as in claim 1 further comprising a rotation stop positioned between said intermediate section and said second outer section when extended for limiting the downward displacement of said second outer section.

11. A tool bar as in claim 10 wherein said rotation stop includes variable positioning means for variably adjusting the downward displacement of said second outer section when extended.

12. A tool bar as in claim 1 further comprising torsional coupling means connecting said intermediate and second outer sections when extended for compensating for twisting moments applied to said second outer section and maintaining alignment between said intermediate and second outer sections when extended.

13. In a folding tool bar pulled by a traction vehicle for supporting agricultural implements mounted thereon and including a main frame and first and second wing sections flexibly coupled to respective ends of said main frame wherein said wing sections are selectively movable from a working position with said wing sections generally in end-to-end alignment with said main frame and a non-working position with said wing sections displaced generally above said main frame, the improvement comprising:

hinge means incorporated in said second wing section whereby said second wing section is comprised of an intermediate member flexibly coupled to said main frame and an outer member coupled resiliently by damping means to said intermediate member wherein said first wing section and the outer member of said second wing section are aligned generally horizontally and parallel to said main frame when positioned in the non-working position.

* * * * *